United States Patent
Kwak (10) Patent No.: US 12,194,560 B2
(45) Date of Patent: Jan. 14, 2025

(54) METHOD FOR PREVENTING SPOT WELDING CRACK OF GALVANIZED STEEL PLATE

(71) Applicant: POSCO, Pohang-si (KR)

(72) Inventor: Jai-Hyun Kwak, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 102 days.

(21) Appl. No.: 16/770,295

(22) PCT Filed: Dec. 13, 2018

(86) PCT No.: PCT/KR2018/015843
§ 371 (c)(1),
(2) Date: Jun. 5, 2020

(87) PCT Pub. No.: WO2019/124875
PCT Pub. Date: Jun. 27, 2019

(65) Prior Publication Data
US 2021/0170516 A1   Jun. 10, 2021

(30) Foreign Application Priority Data
Dec. 22, 2017 (KR) .................. 10-2017-0177753

(51) Int. Cl.
*B23K 11/11*   (2006.01)
*B23K 11/16*   (2006.01)
(Continued)

(52) U.S. Cl.
CPC .............. *B23K 11/11* (2013.01); *B23K 11/16* (2013.01); *B23K 11/34* (2013.01); *C23C 2/06* (2013.01); *B23K 2103/04* (2018.08)

(58) Field of Classification Search
CPC ......... B23K 11/11; B23K 11/16; B23K 11/34; B23K 11/115; B23K 11/166;
(Continued)

(56) References Cited

U.S. PATENT DOCUMENTS

2015/0125716 A1* 5/2015 Kojima .................. C21D 1/673
148/533
2015/0217396 A1* 8/2015 Okada .................. B23K 11/115
219/91.22

(Continued)

FOREIGN PATENT DOCUMENTS

| CN | 105252130 A | 1/2016 |
| CN | 105792977 A | 7/2016 |

(Continued)

OTHER PUBLICATIONS

Chinese Office Action dated Apr. 28, 2021 issued in Chinese Patent Application No. 201880082882.7 (with English translation).

(Continued)

*Primary Examiner* — Janie M Loeppke
*Assistant Examiner* — Simpson A Chen
(74) *Attorney, Agent, or Firm* — Morgan, Lewis & Bockius LLP (57) ABSTRACT

One aspect of the present invention provides a method for preventing spot welding crack of a galvanized steel plate, which can reduce crack occurring due molten zinc having a low melting point when a galvanized advanced high strength steel (AHSS) plate is spot-welded, and can thus improve welding strength and fatigue life.

7 Claims, 6 Drawing Sheets
(1 of 6 Drawing Sheet(s) Filed in Color)

(51) Int. Cl.
*B23K 11/34* (2006.01)
*B23K 103/04* (2006.01)
*C23C 2/06* (2006.01)

(58) Field of Classification Search
CPC ........... B23K 2103/04; B23K 2101/34; B23K 2101/006; C23C 2/06; C23C 2/28; C23C 2/26
USPC .......................................... 219/91.2
See application file for complete search history.

(56) References Cited

U.S. PATENT DOCUMENTS

| | | | |
|---|---|---|---|
| 2016/0271719 | A1 | 9/2016 | Taniguchi et al. |
| 2016/0271720 | A1* | 9/2016 | Sawanishi ............... B23K 11/24 |
| 2020/0361021 | A1* | 11/2020 | Furusako ............... B23K 11/24 |

FOREIGN PATENT DOCUMENTS

| | | |
|---|---|---|
| CN | 106425070 A | 2/2017 |
| JP | H05-277752 A | 10/1993 |
| JP | H07-040050 A | 2/1995 |
| JP | 2008-093726 A | 4/2008 |
| JP | 2014-223634 A | 12/2014 |
| KR | 10-0722130 B1 | 5/2007 |
| KR | 10-0804943 B1 | 2/2008 |
| KR | 10-2011-0071941 A | 6/2011 |
| KR | 10-2012-0017955 A | 2/2012 |
| KR | 10-2014-0136509 A | 11/2014 |
| KR | 10-2015-0066366 A | 6/2015 |
| KR | 10-2015-0073317 A | 7/2015 |
| KR | 10-2015-0075719 A | 7/2015 |
| KR | 20150075719 A * | 7/2015 ........... B23K 11/166 |
| KR | 10-2015-0132959 A | 11/2015 |
| KR | 10-1568614 B1 | 11/2015 |
| KR | 10-2016-0054035 A | 5/2016 |
| KR | 10-2016-0080120 A | 7/2016 |

OTHER PUBLICATIONS

International Search Report dated Mar. 8, 2019 issued in International Patent Application No. PCT/KR2018/015843 (along with English translation).

* cited by examiner

| CURRENT(kA) | AVERAGE Fe CONCENTRATION IN PLATING LAYER (Fe%/Fe%+Zn%) |
|---|---|
| 0 | 0.46 |
| 4 | 0.51 |
| 5 | 0.54 |
| 9 | 0.63 |

METHOD FOR PREVENTING SPOT WELDING CRACK OF GALVANIZED STEEL PLATE

CROSS-REFERENCE OF RELATED APPLICATIONS

This application is the U.S. National Phase under 35 U.S.C. § 371 of International Patent Application No. PCT/KR2018/015843, filed on Dec. 13, 2018, which in turn claims the benefit of Korean Application No. 10-2017-0177753, filed on Dec. 22, 2017, the entire disclosures of which applications are incorporated by reference herein.

TECHNICAL FIELD

The present invention relates to a method for reducing cracking during spot-welding of a galvanized steel sheet.

BACKGROUND ART

Steel sheets galvanized with advanced high strength steels (hereinafter, "AHSS") have recently been used as a material for vehicles.

Such galvanized AHSS has a transformed structure formed at a low temperature and thus has excellent strength and ductility, whilst having excellent corrosion resistance due to sacrificial anode corrosion of zinc.

In order to secure the high strength of galvanized AHSS, however, large amounts of alloy elements are added. Particularly in the case of galvanized steel sheets to which a large amount of carbon or manganese is added, cracking tends to frequently occur during spot welding.

The spot welding technology of AHSS steel sheets has so far been the most general method of controlling a welding current pattern to improve welding strength (Patent Documents 1 to 3).

However, as ultra high strength steel sheets having tensile strength of 1000 MPa or more have been developed, welding cracking due zinc has become a problem, but there is no appropriate means to resolve the problem. Further, similarly to the existing methods, pressing force and welding current patterns are only controlled during welding (Patent Documents 4 to 6), and thus, the problem cannot be fundamentally solved.

A main cause of a defect, such as cracking, during spot welding of a high-alloy galvanized AHSS is liquid metal embrittlement (hereinafter, "LME"), and prerequisites for the LME to occur are a load or deformation over a critical point, a molten metal and austenite appearance.

When spot welding is performed on a high-alloy galvanized AHSS, a temperature of the steel rises due to resistance heat as current is applied, and zinc having a low melting point first begins to melt. Thereafter, the steel is transformed into austenite. The lower the austenite formation temperature, the longer contact time between the molten zinc and the austenite structure of the steel on a surface. In this case, when a thermal stress and an external stress are applied, an austenite grain boundaries of a portion where the stress is concentrated glide and deform. When interfacial energy between the steel and the molten zinc is lower than that of the austenite grain boundaries, the grain boundary cracking occurs as the molten zinc penetrates into the austenite grain boundaries.

Figure 1:
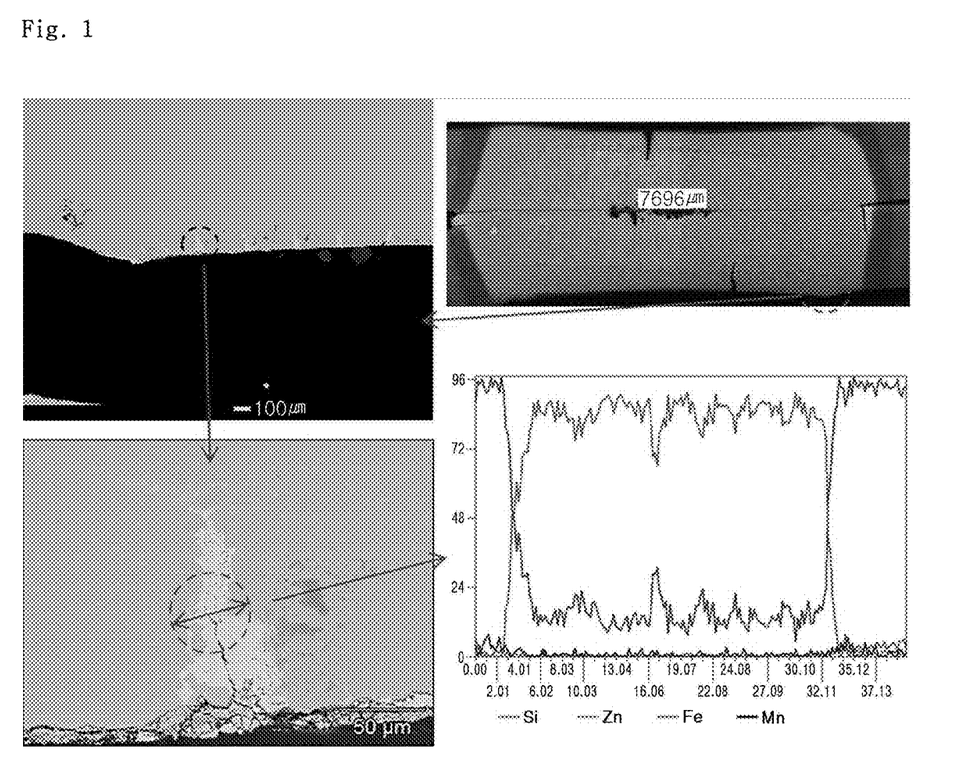
FIG. 1 is a result of analyzing large cracks and micro cracks appearing during welding of existing galvannealed AHSS having tensile strength of 1200 MPa.

FIG. 1 shows a result of analyzing large cracks and micro cracks appearing when welding commercially available galvannealed AHSS having tensile strength of 1200 MPa. It is observed that a significant amount of zinc was detected in a cracked area.

Meanwhile, in order to minimize welding cracking due to LME, only one of the above-described three factors needs to be removed.

First, appearance of austenite is to be suppressed. As a welding temperature rises to a melting point during welding, the appearance of austenite in steel can never be prevented. Rather, the more the alloying elements, such as C and Mn, exist, the more the A3 temperature is reduced. Accordingly, high-alloy galvanized AHSS is more likely to crack due to LME as austenite appears at much lower temperatures. Next, a plating thickness is to be reduced such that the melting temperature of zinc or an amount of molten zinc is reduced. This is closely related to corrosion resistance and workability of the steel sheet. Besides, it is not easy as plating costs increase. Last, an external stress is to be reduced, which is difficult as the bonding strength and quality of the weld zone are related.

Most of the technologies, which have thus far been suggested, are related to controlling an austenite-appearing speed, a welding current pattern to reduce stress, controlling pressing force to reduce an external stress, and reducing an amount of a molten metal by reducing a thickness of a plating layer instead of improving corrosion resistance; however, none of the technologies can substantially and sufficiently suppress microcracking due to LME.

Patent Document 1: Korean Patent Laid-Open Publication No. 2015-0132959
Patent Document 2: Korean Patent Laid-Open Publication No. 2006-0112701
Patent Document 3: Japanese Patent Laid-Open Publication No. 2008-093726
Patent Document 4: Korean Patent Laid-Open Publication No. 2014-0190199
Patent Document 5: Korean Patent Laid-Open Publication No. 2011-0071941

DISCLOSURE

Technical Problem

An aspect of the present invention is to provide a method for preventing spot welding cracking of a galvanized steel sheet that can reduce the occurrence of cracks due to low melting point molten zinc during spot welding of a galvanized AHSS steel sheet and improve welding strength and fatigue life.

The technical problem of the present invention is not limited to the above. Additional problems are described throughout the specification, and those skilled in the art to which the present invention pertains will understand the additional problems based on the specification without any difficulty.

Technical Solution

According to an aspect of the present invention, a method for preventing cracking during spot-welding of a galvanized steel sheet includes preparing a galvanized steel sheet on which a plating layer is formed on at least one surface of a base steel sheet; molding the galvanized steel sheet; heating a welding spot of the molded galvanized steel sheet; and spot welding the heated welding spot, wherein the heating is performed using a current in the range of 0.4 times an exclusion-occurring current to the exclusion-occurring current.

Advantageous Effects

According to the present invention, effects of significantly improving welding strength and fatigue performance of a vehicle body can be obtained by suppressing a defect, such as cracking, or the like, due to LME when welding an existing galvanized advanced high strength steel (AHSS) having GIGA level strength.

Further, the present invention is advantageous in that an application of the GIGA level strength-galvanized AHSS can be extended and safety and durability of the vehicle body can be improved.

DESCRIPTION OF DRAWINGS

The patent or application file contains at least one drawing executed in color. Copies of this patent or patent application publication with color drawing(s) will be provided by the office upon request and payment of the necessary fee.

BEST MODE

The present inventors endeavored to find a method for more effectively suppressing cracking due to LME in terms of spot welding of a galvanized AHSS having GIGA level strength, as compared to conventional welding methods.

As a result, the present inventors have confirmed that the cracking in a weld zone after welding can be greatly reduced by heat treatment of the welding spot before welding of a gigapascal (GPa) level-galvanized AHSS, thereby completing the present invention.

In particular, the present inventors have found that the higher the iron (Fe) content in the welding spot during welding of the galvanized steel sheet, the more it can suppress the cracking due to LME during molding. In this regard, there is technical significance in providing an optimal method to increase the iron (Fe) content in a portion to be welded before welding of the galvanized steel sheet.

The present invention will hereinafter be described in detail.

According to an aspect of the present invention, a method for preventing cracking of spot-welding of a galvanized steel sheet, including preparing a galvanized steel sheet on which a plating layer is formed on at least one surface of a base steel sheet; molding the galvanized steel sheet; heating a welding spot of the molded galvanized steel sheet; and spot welding the heated welding spot, can be provided and is described in detail below.

A galvanized steel sheet, on which a plating layer is formed on at least one surface of a base steel sheet, may be formed.

The base steel sheet is not particularly limited, but is preferably an ultrahigh steel sheet for vehicles; for example, it may be an advanced high strength steel (AHSS) mainly used as a vehicle material due to its excellent properties. As an example, the AHSS may be a transformation induced plasticity (TRIP) steel, a complex phase (CP) steel, a dual phase (DP) steel, or the like, having a high content of carbon (C) or manganese (Mn) and high tensile strength of 980 MPa or above, but is not limited thereto.

As an aspect, a plating layer is provided on at least one surface of such base steel sheet, and the plating layer may be a zinc-based plating layer. The zinc-based plating layer may be formed by a conventional plating method. Plating conditions are not particularly limited. The plating layer may be a zinc-based alloying plating layer.

Thus-prepared galvanized steel sheet may be molded.

The molding is to obtain a desired shape. In one aspect, a method for pressing the AHSS galvanized steel sheet to have a desired shape using a mold can be applied.

Before welding thus-molded galvanized steel sheet, heating may be performed. Specifically, a portion for welding the molded galvanized steel sheet may be heated.

The heating may be performed in the same manner as the welding, which is described below. In an aspect, when the welding is spot welding, the heating may be performed in the same manner as the spot welding.

Before welding the molded galvanized steel sheet, the portion (welding spot) to be welded is treated with high temperature in advance to increase an Fe content in a plating layer, particularly the plating layer in contact with the base steel. In other words, when the welding spot is heated with a high temperature, Fe atoms in the base steel diffuse into the plating layer, and an Fe concentration in the plating layer rapidly increases. This gives rise to an increased melting point of the plating layer, which in turn makes it possible to obtain an effect of suppressing formation of molten zinc at high temperatures at which a deformation is easily generated.

The heating may be performed directly after the molding or directly before the welding. Alternately, the heating may be performed in a final molding process.

More specifically, the heat treatment may be performed using an electrode followed by cooling. The heat treatment may be performed using a current in the range of 0.4 times an exclusion-occurring current to the exclusion-occurring current for 0.5 seconds to 2 seconds.

When the current amount is less than 0.4 times the exclusion-occurring current, the heating cannot be completed in 0.5 seconds to 2 seconds and the Fe diffusion cannot sufficiently diffuse in the base steel. In contrast, the current amount above the exclusion-occurring current makes subsequent welding processes difficult due to excessive exclusion.

When the heating is performed within the above current range, the welding spot is heated to a temperature as high as 770° C. or above, preferably 770° C. to 950° C., thereby enabling the Fe atoms in the base steel to easily diffuse.

Meanwhile, the cooling may be air cooling.

The portion for welding, that is, the welding spot may have a size corresponding to a welded zone, which is produced in the subsequent welding. In an aspect, the welding spot may be set to have an area over 1.2 times a desired nugget diameter.

That is, the previously described heating may be performed in an area over 1.2 times a welding nugget diameter.

As used herein, the expression "desired nugget diameter" refers to a nugget diameter for obtaining required welding strength for subsequent welding.

When the welding spot is heated over the area over the nugget diameter, a tungsten or copper electrode may be used, but is not limited thereto. Any electrode used in conventional spot welding can be used.

The welding spot may be heated by applying a current to the welding spot using the electrode.

Further, when heating the welding spot using the electrode, the pressure of the electrode can be performed with a pressing force such that the base steel sheet is not deformed.

As an example, when a galvanized AHSS having a tensile strength of 980 MPa or more is heated using the tungsten or copper electrode, 40% or more of the current generating spatter may be applied for a welding time of ⅙ seconds.

Figure 3:
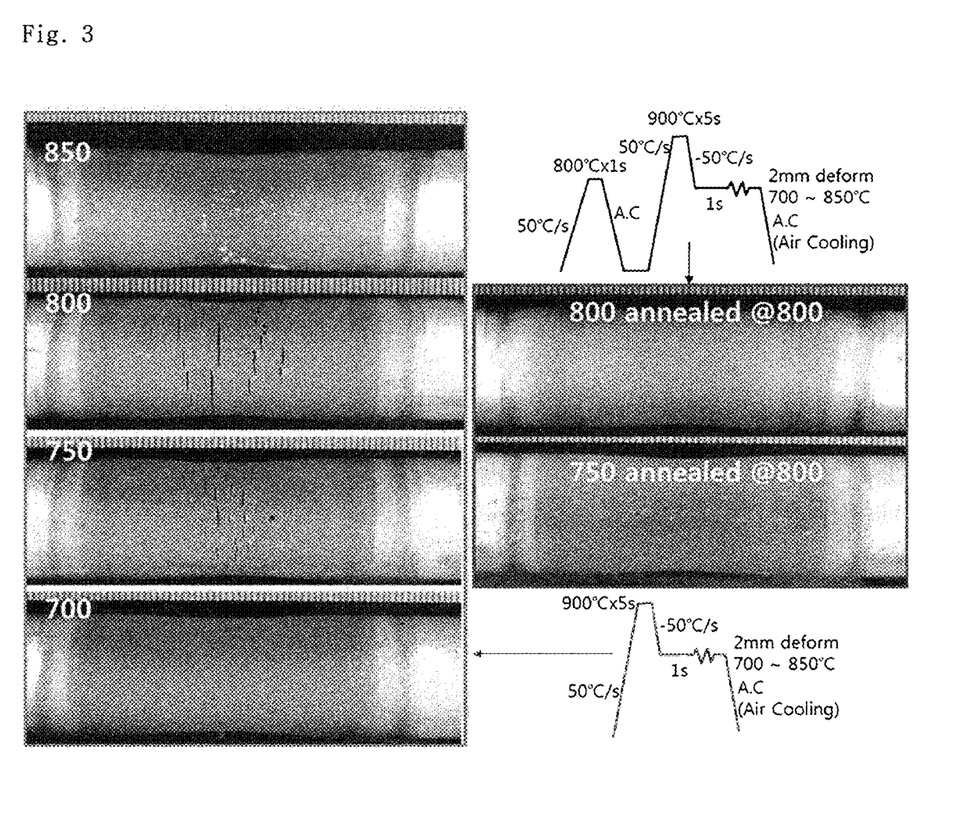
FIG. 3 is a diagram illustrating a degree of occurrence of LME cracking by heat treatment/non-treatment before welding of a galvanized steel sheet, which has been molded, observed according to an exemplary embodiment of the present invention.

FIG. 3 illustrates an observation of a degree of occurrence of LME cracking by heat treatment/non-treatment before welding of a galvanized steel sheet, which has been molded.

First, a steel plate (AHSS) having tensile strength of 980 MPa or more was produced as a 10 mm rod-shaped sample followed by electro-galvanizing to a thickness of 10 μm. Subsequently, one sample was first heat-treated at 800° C. for 1 second using an electric heating-type Gleeble resistance heating device, and then cooled, followed by heat treatment at 900° C. for 5 seconds. Another sample was heat-treated at 900° C. 5 seconds. The two samples were then subject to deform per temperature to observe whether cracking occurs. The heat treatment at 900° C. can be seen as a welding simulation condition.

As illustrated in FIG. 3, in the case of sample (a), which is not heat-treated at 800° C. for 1 second, the cracking due to LME is clearly observed. In contrast, no cracking due to LME after deformation was observed at all in heat-treated sample (b).

Figure 4:
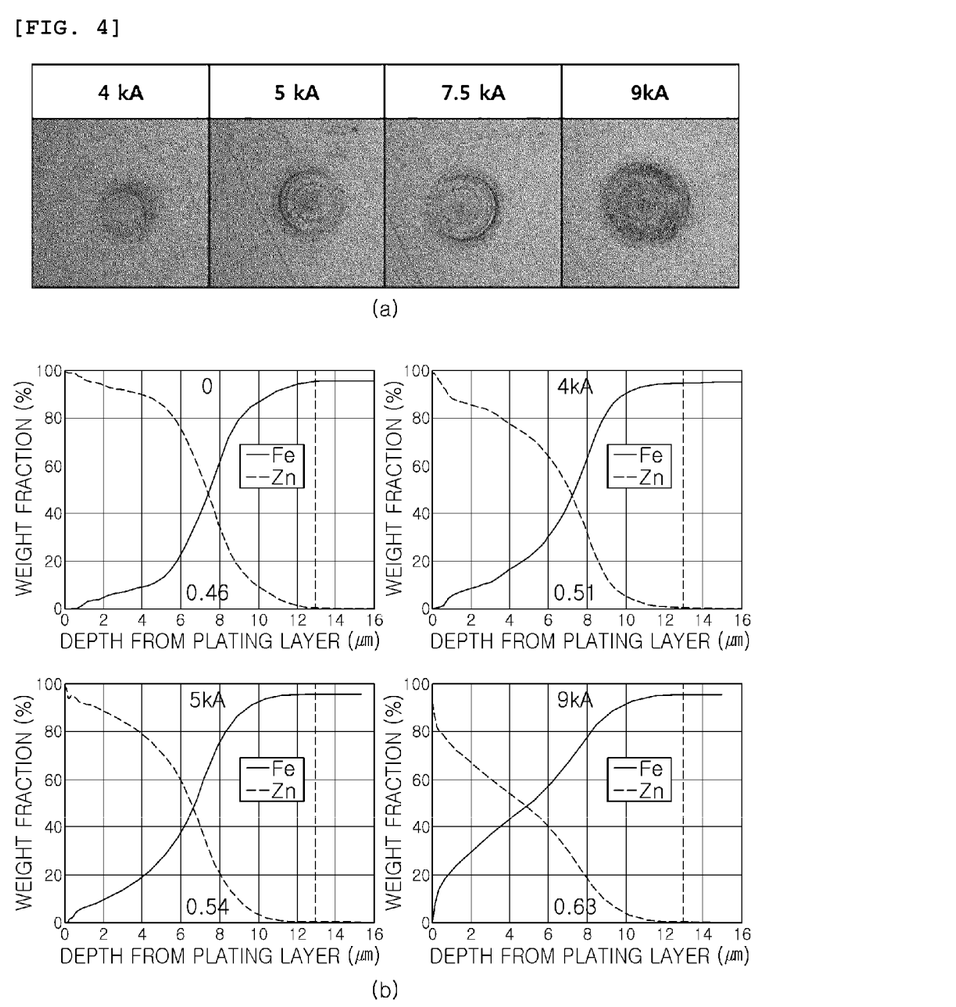
FIG. 4 is diagrams illustrating an area change and a concentration change in a plating layer depending on an amount of a current during the heat treatment before welding of the molded galvanized steel sheet, according to an exemplary embodiment of the present invention.

FIG. 4 is diagrams illustrating an area change and a concentration change in a plating layer depending on an amount of a current during the heat treatment before welding of the galvanized steel sheet, which has been molded.

The samples used in FIG. 3 are used, and the current of heat treatment varied within the range of 4 kA to 9 kA.

According to (A) of FIG. 4, it can be seen that an heat-treated area increases as the amount of current increases. According to (B) of FIG. 4, the temperature increases as the amount of current increases during heating, thereby increasing the Fe concentration in the plating layer.

The welding spot heated as the above has an increased Fe concentration in the plating layer. It is preferable that the Fe concentration in the plating layer at an interface of the plating layer and the base steel be 65 wt % or more.

When the Fe concentration in the plating layer at an interface of the plating layer and the base steel is secured at 65 wt % or more by the heating process, the melting temperature of the plating layer increases. As such, a liquid metal does not exist in a temperature range in which the austenite grain boundaries are most vulnerable. That is, when the subsequent welding is performed while the melting temperature of the plating layer is increased, the liquid metal, such as molten zinc, is not generated at the temperature at which welding is performed. Accordingly, the molten metal may be prevented from penetrating into the austenite grain boundaries, thereby effectively blocking the occurrence of cracking, and the like, by LME.

In addition, the heated welding spot may have an average Fe concentration of 50 wt % or more in the entire plating layer. That is, when measuring glow discharge spectrometry (GDS) of the plating layer of the heated welding spot, an average Fe concentration, represented by Equation (1) below, may be 0.5 or more.

As previously described, the melting point of the plating layer can be increased to a temperature or above, for example, 900° C. or above, at which the liquid iron-zinc metal appears, by securing the Fe concentration in the plating layer at 50 wt % or above. This enables to prevent the penetration of the molten metal into the austenite grain boundaries during the subsequent welding.

$$\text{Average Fe concentration in the plating layer} = \text{Fe}(\%)/(\text{Fe}(\%) + \text{Zn}(\%)). \quad \text{Equation (1)}$$

Thus heat-treated galvanized steel sheet is spot welded. In this case, the pre-heated welding spot may be spot welded.

The spot welding may be performed under spot welding conditions for a conventional vehicle steel sheet, and the conditions are not particularly limited.

Figure 2:
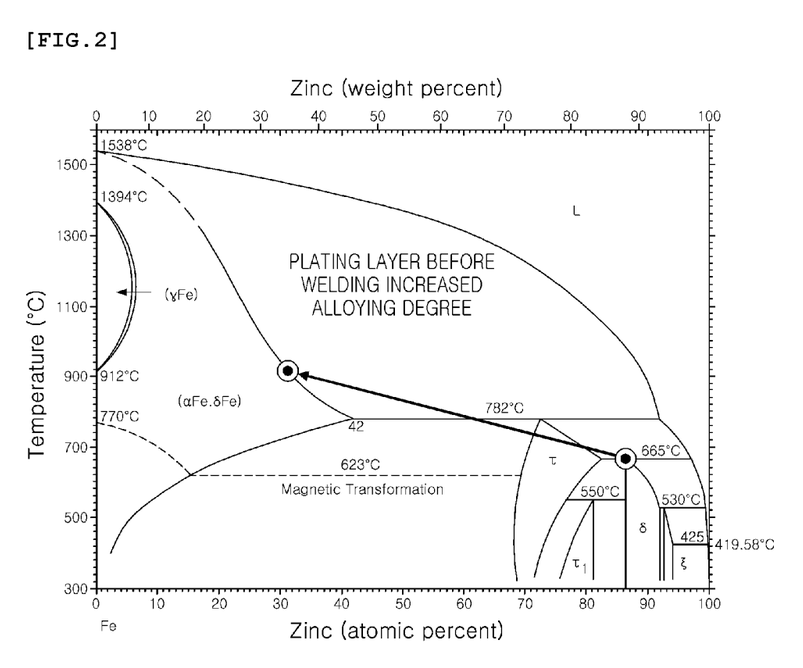
FIG. 2 is a state diagram illustrating an iron-zinc alloy.

As previously described, as an aspect, a state diagram of the iron-zinc alloy of FIG. 2 can describe that cracking due to LME during welding can be prevented by heat-treating the welding spot before welding.

A conventional galvannealed steel sheet (GA) or galvanized steel sheet (GI) contains 15 wt % or less of Fe in the galvanized layer. When such plated steel sheet is rapidly re-heated, molten zinc is produced at a temperature of 650° C. or less. In the case of the galvanized steel sheet having tensile strength of 980 MPa or more, however, deformation occurs due to a slip of the grain boundary when a deformation force acts in the temperature range of 750° C. to 850° C., which is a lowest austenite single-phase temperature range, and cracking easily occurs in the grain boundary when the grain boundary is brittle. In this case, in the presence of a molten metal, the molten metal easily penetrates into an austenite crystal grain boundary, and brittle fracture by molten zinc occurs due to a significant decrease in the grain boundary bonding force. Accordingly, in order to suppress defects, such as brittle fracture by LME, a liquid metal such as molten zinc needs to be removed. Further, a means for increasing the melting point of the liquid metal is provided in the present invention.

Figure 5:
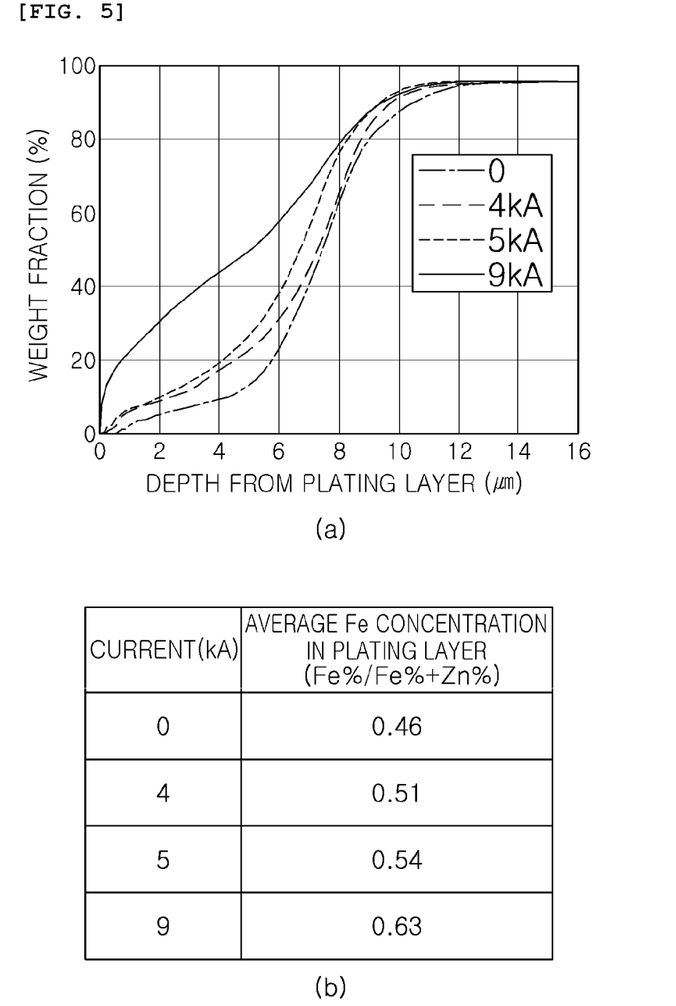
FIG. 5 is diagrams illustrating a change in an iron (Fe) concentration in the plating layer depending on a current amount during the heat treatment before welding of the galvannealed steel sheet, which has been molded, according to an exemplary embodiment of the present invention.

FIG. 5 is diagrams illustrating a change in an iron (Fe) concentration in the plating layer depending on a current amount during the heat treatment before welding of the galvannealed steel sheet, which has been molded. The current amount refers to a heating means of the heat treatment.

As for the sample, to which a current of 4 kA to 9 kA is applied for ⅙ seconds, glow discharge-optical emission spectrometer (GDS) was used to completely remove the plating layer and measured until the base steel appears. A concentration curve of zinc was integrated to obtain the average Fe concentration (Fe (%)/(Fe (%)+Zn (%)) in the plating layer.

As illustrated in FIG. 5, the average Fe concentration in the plating layer of the sample (current of 0 kA), which is a GA material of 12% alloying degree without heat treatment, is 0.46, while in the heat-treated sample, the average Fe concentration in the plating layer increases as the current amount (4 kA to 9 kA) increases.

Figure 6:
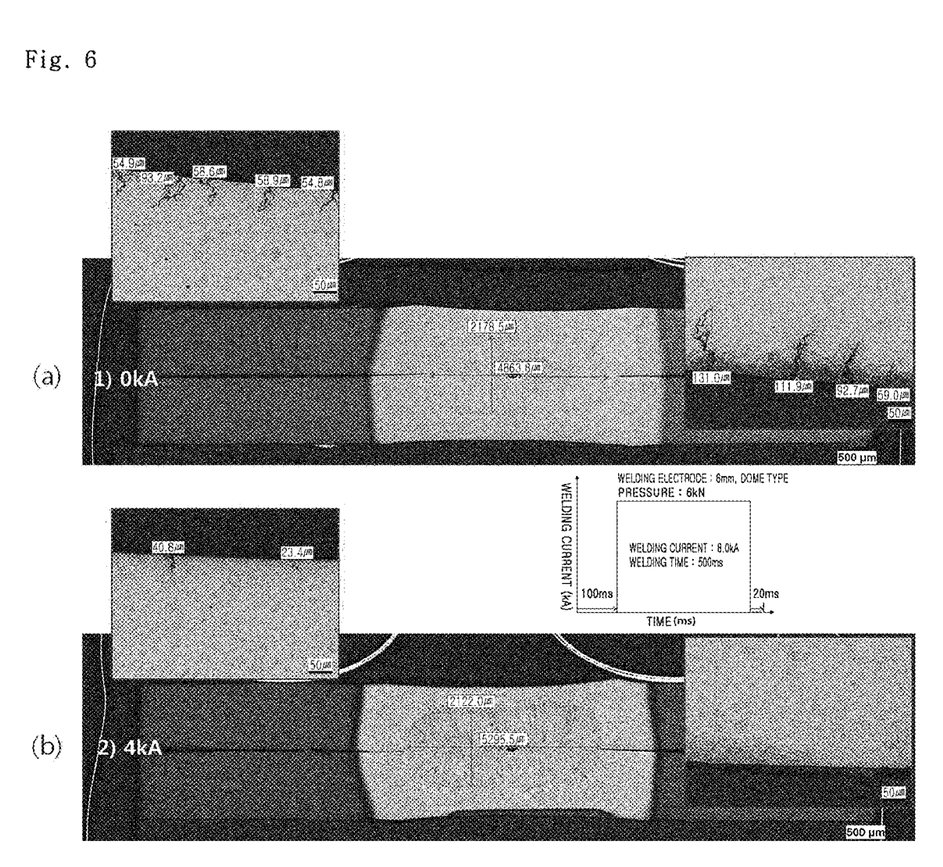
FIG. 6 is diagrams illustrating a cross-section of the spot weld zone depending on the heat treatment/non-treatment before welding of the galvannealed steel sheet, which has been molded, observed according to an exemplary embodiment of the present invention.

FIG. 6 is diagrams illustrating a cross-section of the spot-welded zone of the sample heat-treated with 4 kA current and that of the sample which is not heat-treated.

As illustrated in FIG. 6, in the case of sample (a), which is not heat-treated, the cracking remarkably occurs in the spot-welded zone. In contrast, in the case of the heat-treated sample (b), cracking is effectively suppressed in the spot-welded zone as compared to sample (a).

This is due to the fact that the molten zinc is sufficiently removed by the heat treatment by the means presented in the present invention before welding, and non-uniformity of contact resistance during spot welding is also reduced, thereby forming a larger nugget. This makes it advantageous in securing welding strength.

The invention claimed is:

1. A method for preventing spot welding cracking of a galvanized steel sheet, comprising:
   preparing a galvanized steel sheet on which including a base steel sheet and a plating layer formed on at least one surface of the base steel sheet;
   press molding the galvanized steel sheet thereby changing the galvanized steel sheet for obtaining a desired shape to form a molded galvanized steel sheet;
   heating a welding spot of the molded galvanized steel sheet to a temperature of 770° C. to 950° C. directly before welding thereby increasing a concentration of Fe in an interface between the plating layer and the base steel to be 65 wt % or more; and
   spot welding the heated welding spot,
   wherein the heating is performed using a current in the range from 0.4 times of an exclusion-occurring current to the exclusion-occurring current,
   the heating is performed an area over 1.2 times a nugget diameter, and
   the spot welding is conducted without cooling the heated welded spot.

2. The method of claim 1, wherein the heating is performed using a tungsten or copper electrode.

3. The method of claim 1, wherein an average Fe concentration in an entire area of the plating layer is 50 wt % or more.

4. The method of claim 1, wherein, when measuring glow discharge spectrometry (GDS) of the plating layer, an average Fe concentration, represented by Equation (1) below, is 0.5 or more:

$$\text{Average Fe concentration} = \text{Fe (\%)}/(\text{Fe (\%)} + \text{Zn (\%)}). \quad \text{Equation (1)}$$

5. The method of claim 1, wherein the base steel sheet is an advanced high strength steel (AHSS) having tensile strength of 980 MPa or more.

6. The method of claim 1, wherein the base steel sheet is an advanced high strength steel (AHSS).

7. The method of claim 1, wherein the plating layer is a zinc-based alloying plating layer.

* * * * *